(12) United States Patent
Van Bilderbeek (10) Patent No.: US 7,344,162 B2
(45) Date of Patent: Mar. 18, 2008

(54) PIPE JOINT (75) Inventor: Bernard Herman Van Bilderbeek, London (GB)

(73) Assignee: Plexus Ocean Systems Limited (GB)

( * ) Notice: Subject to any disclaimer, the term of this patent is extended or adjusted under 35 U.S.C. 154(b) by 0 days.

(21) Appl. No.: 10/204,870

(22) PCT Filed: Feb. 23, 2001

(86) PCT No.: PCT/GB01/00766

§ 371 (c)(1),
(2), (4) Date: Dec. 2, 2002

(87) PCT Pub. No.: WO01/63161

PCT Pub. Date: Aug. 30, 2001

(65) Prior Publication Data

US 2003/0141718 A1 Jul. 31, 2003

(30) Foreign Application Priority Data

Feb. 23, 2000 (GB) .................................. 0004212.7

(51) Int. Cl.
F16L 17/00 (2006.01)
F16L 35/00 (2006.01)

(52) U.S. Cl. .......................... 285/95; 285/331; 285/920
(58) Field of Classification Search ................ 285/920, 285/331, 330, 95, 382
See application file for complete search history.

(56) References Cited

U.S. PATENT DOCUMENTS

| 181,714 | A | * | 8/1876 | Pennie | 285/322 |
| 1,234,537 | A | * | 7/1917 | Goodall | 285/322 |
| 1,532,886 | A | * | 4/1925 | Cowles | 285/243 |
| 1,670,259 | A | * | 5/1928 | Herlbauer | 285/322 |
| 2,507,261 | A | * | 5/1950 | Mercier | 285/341 |
| 3,149,860 | A | * | 9/1964 | Hallesy | 285/18 |
| 3,380,765 | A | * | 4/1968 | Himmel | 285/331 |
| 3,492,027 | A | * | 1/1970 | Herring | 285/18 |
| 3,498,648 | A | * | 3/1970 | Hallesy | 285/343 |
| 3,554,579 | A | * | 1/1971 | Brown | 285/18 |
| 3,695,633 | A | * | 10/1972 | Hanes | 285/18 |
| 3,765,708 | A | * | 10/1973 | Pease et al. | 285/382.2 |
| 4,061,367 | A | * | 12/1977 | Moebius | 285/382.2 |
| 4,281,856 | A | * | 8/1981 | Litman et al. | 285/15 |
| 4,364,587 | A | * | 12/1982 | Samford | 285/3 |
| 4,453,745 | A | * | 6/1984 | Nelson | 285/18 |
| 4,477,105 | A | * | 10/1984 | Wittman et al. | 285/18 |

(Continued)

FOREIGN PATENT DOCUMENTS

CH 469218 4/1969

(Continued)

Primary Examiner—Vishal Patel
(74) Attorney, Agent, or Firm—Mark A. Tidwell, Esq.; Jackson Walker L.L.P.

(57) ABSTRACT

A joint for joining the ends of two pipes (12, 14) has a socket (or box) on the end of one pipe (14) into which the end (30) of the other pipe is inserted. The part (36) of the socket which surrounds the inserted pipe has an external tapered surface (38). A correspondingly tapered sleeve (42) surrounds the socket and can be moved axially to apply a compressive force to the taper on the socket which is thus compressed inward against the inserted pipe end to frictionally grip the inserted pipe end.

6 Claims, 7 Drawing Sheets

U.S. PATENT DOCUMENTS

| | | | |
|---|---|---|---|
| 4,516,795 A * | 5/1985 | Baugh | 285/315 |
| 4,525,001 A * | 6/1985 | Lumsden et al. | 285/328 |
| 4,648,627 A * | 3/1987 | Reimert | 285/24 |
| 4,650,225 A | 3/1987 | Le et al. | 285/348 |
| 4,671,539 A * | 6/1987 | Reneau | 285/18 |
| 4,693,497 A * | 9/1987 | Pettus et al. | 285/12 |
| 4,708,376 A * | 11/1987 | Jennings et al. | 285/315 |
| 4,771,832 A | 9/1988 | Bridges | 166/380 |
| 5,219,186 A * | 6/1993 | Hosseinian et al. | 285/39 |
| 5,347,701 A * | 9/1994 | Hosseinian et al. | 29/508 |
| 5,405,176 A * | 4/1995 | Babel et al. | 285/382 |
| 5,421,623 A * | 6/1995 | Cassin | 285/343 |
| 5,954,374 A * | 9/1999 | Gallagher et al. | 285/332 |
| 6,092,596 A | 7/2000 | Van Bilderbeek | 166/89.1 |
| 6,109,817 A * | 8/2000 | Burns et al. | 403/305 |
| 6,485,063 B1 * | 11/2002 | Olivier | 285/333 |

FOREIGN PATENT DOCUMENTS

| | | |
|---|---|---|
| EP | 0626535 | 11/1994 |
| GB | 2195411 | 4/1988 |

* cited by examiner

PIPE JOINT

This invention relates to a pipe joint, for connecting end to end two lengths of pipe of the same nominal diameter.

The invention is of particular use for connecting pipes in oil and gas wells for use in a subsea environment. Such pipes typically have diameters in the range 8 inches to 26 inches (200 to 650 mm).

European Patent Application 0 626 535 discloses a pipe joint in which one pipe end fits inside the other pipe end, and the pipe ends have interengaging flared forms which are forced axially into one another to produce a metal to metal joint.

According to the invention, there is provided a pipe joint in which an end of a first pipe is joined to an end of a second pipe, wherein the first pipe end has an annular socket for receiving the second pipe end, an outer wall of the socket has an annular, axially tapering surface, an axially movable sleeve surrounds the outer wall and has a corresponding tapering surface facing the outer wall, the joint including means for producing relative axial movement between the tapering surfaces to exert a radial compressive force to the outer wall of the socket, thereby to compress the socket wall into engagement with the second pipe end.

Compressing the socket wall brings the wall into frictional and/or interlocking engagement with the second pipe end.

Preferably both the first and second pipe ends are stub pipes adapted to be welded at the ends of pipe lengths, with the internal diameter of the stub pipes being the same as that of the pipe lengths to which they are to be welded.

A joint of this type can be used to produce a metal to metal seal between two pipes, over a long length, without requiring relative axial movement of the pipes. The seal can be broken to separate the pipes by reversing the direction of the relative axial movement. The invention is not however restricted to joints where a seal is formed between the two halves of the joint.

The end of the second pipe (also called a pin) which enters the socket (also called a box) preferably engages in the socket to prevent radially inward deformation of the leading tip of the second pipe end. The end of the second pipe can have a rim which fits inside an annular groove in the end of the first pipe.

The joint can comprise a first, socket, section for fixing to an end of a first pipe and a second, pin, section for fixing to an end of a second pipe, the pin being adapted to be received in the socket.

The means for producing relative axial movement preferably comprises a pressure chamber between the sleeve and the socket, and a hydraulic circuit for pressurising the chamber with hydraulic pressure.

A locknut can be provided to lock the relative positions of the sleeve and the socket, once these components have been brought into an active position by the application of hydraulic pressure, and a release chamber can be provided to which hydraulic pressure can be admitted to separate the socket and the sleeve.

The tapering surfaces can have a taper angle of between 2° and 6°. Smaller angles require more axial movement to set the seal, but require less force to produce the axial movement of the sleeve. Smaller angles (and therefore lower forces) are particularly appropriate when the pipe diameters are large, as larger pipes have larger circumferences, and there is more friction to overcome when the sleeve is moved axially to set the seal.

The inner wall of the socket and the outer wall of the second pipe end (which are forced into intimate contact with one another when the seal is set) may be provided with surface formations which mesh together when the seal is set. In particular, annular ribs may be formed on these surfaces, with a rib on one surface meshing with a space between two ribs on the other surface, when the second pipe end is fully inserted in the socket. These meshing surface formations can enhance the axial load-bearing capabilities of the joint, can assist correct axial positioning of the two sections and can produce effective metal to metal annular seals at each rib. The ribs will however be of low height, so that they provide no, or minimal, interference with the insertion of the second pipe end in the socket.

The invention will now be further described, by way of example, with reference to the accompanying drawings, in which.

Figure 1:
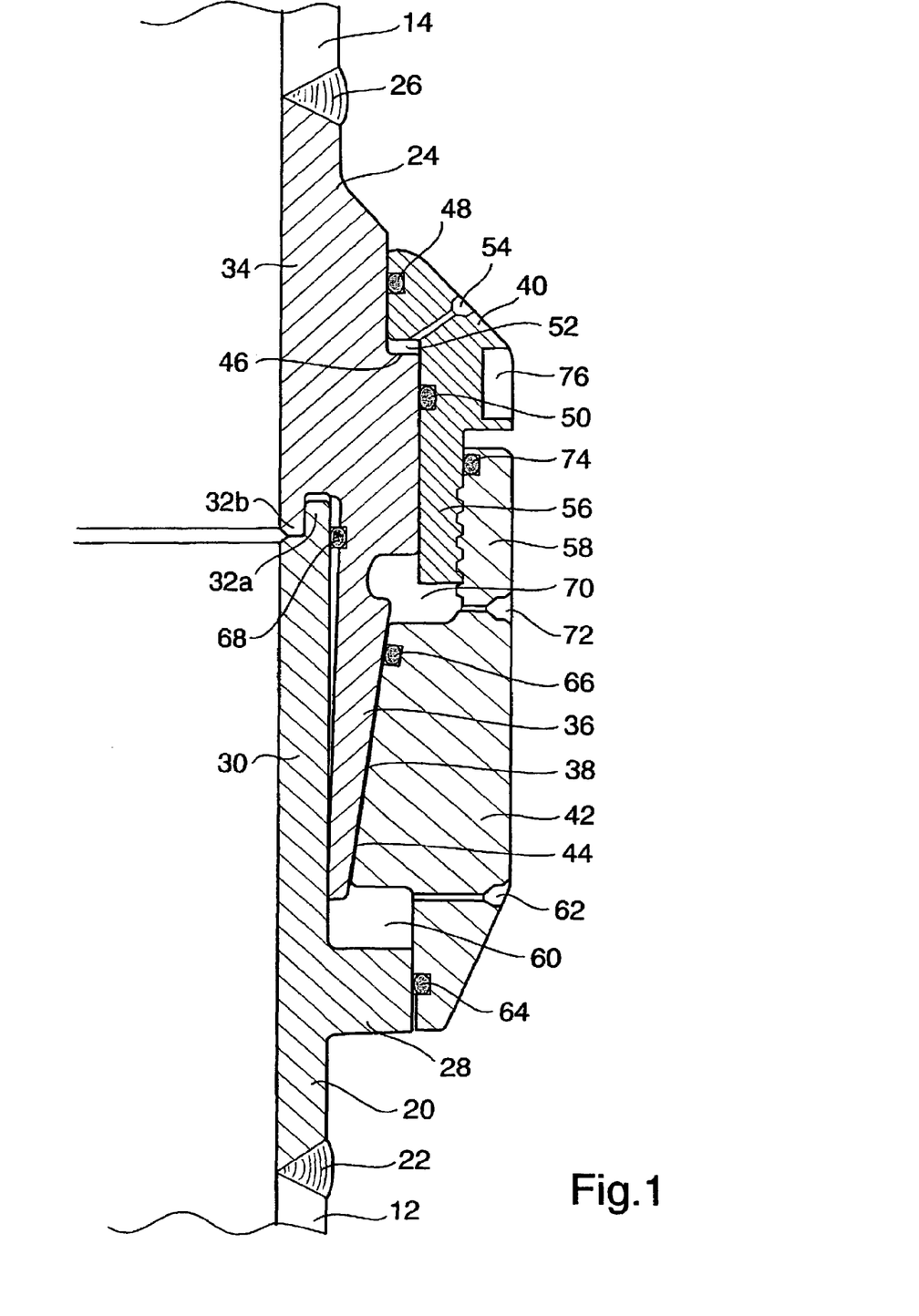
FIG. 1 shows a section through an example of a completed pipe joint in accordance with a first embodiment of the invention.

FIG. 1 shows two sections of riser pipe 12, 14 joined by a pipe joint 16. The riser pipe 12, 14 forms one pipe of an oil well installation.

A connector pin 20 is welded at 22 to the top end of the pipe 12. A connector box 24 is welded at 26 to the bottom end of the pipe 14. References here to 'top' and 'bottom' and 'upper' and 'lower' refer to the orientation shown in the drawing but do not limit in any way the orientation which the pipes and the joint can take, when in use.

The pin 20 has a shoulder 28 (which can be a conventional landing shoulder for the joint, where the lower pipe 12 can be supported on a spider), a tubular section 30 of diameter equal to the pipes 12 and 14, and an edge profile at 32a which will be described later.

The box 24 has a main section 34 of internal diameter equal to that of the pipes 12 and 14, and a depending skirt 36 which fits over the tubular section 30 of the lower pipe and itself has a tapered outer face 38. The lower end of the box section 34 has an edge profile 32b which engages with the profile 32a. Mounted on the box 24 are also a locknut 40 and a sleeve 42. The sleeve 42 has an internal tapered face 44 which cooperates with the tapered outer face 38.

The locknut 40 is located above a shoulder 46, and is sealed against the main box section 34 by two pressure seals 48 and 50. A first lock pressure chamber 52 between the seals 48 and 50 has a pressure port 54. At its lower end, the nut has a threaded collar 56.

The sleeve 42 also has a threaded collar, at 58, and the threads on the collars 56 and 58 mesh with one another. A second lock pressure chamber 60 with a pressure port 62 is located between the landing shoulder 28 and the sleeve 42, this chamber being sealed by seals at 64, 66 and 68. A release pressure chamber 70 is located between the box main section 34 and sleeve 42. This chamber has pressure port 72 and is sealed by seals 50, 66 and 74.

In use, with the pin 20 welded to the pipe 12 and the box 24 welded to the pipe 14 and the sleeve 42 lowered on the locknut 40, the box is slid over the pin until the edge profiles 32a, 32b meet one another.

Next, pressure is applied to the first pressure chamber 52. This has the effect of drawing the sleeve 42 upwards relative to the skirt 36, and as this upward movement continues, the taper action between the sleeve 42 and skirt 36 will compress the skirt inwardly, to grip the tubular section 30 of the pin 20. The action of the pressure in the first chamber 52 can be augmented by pressure in the second pressure chamber 60, but the chamber 60 will not be pressurised until sufficient frictional engagement has been achieved between the tapered surfaces to prevent pressure in the chamber 60 from lifting the box 24 off the pin 20. In this condition, the pin 20 and box 24 are locked together.

To permanently lock the joint, so that there is no reliance on the maintenance of pressure in either of the chambers 52 and 60, the pressure in the chamber 52 is released and the locknut is screwed down (the nut has torquing slots 76 around its outer edge) until the chamber 52 disappears and the nut is in contact with the shoulder 46. Further rotation of the nut will place the collar 56 in tension, holding the sleeve 42 in an uppermost position where it applies compressive hoop stresses to the skirt 36.

To release the joint, the locknut 40 is slackened off and pressure applied in the release chamber 70. This forces the sleeve downwards to release the hoop stresses on the skirt 36 which in turn release its frictional grip on the tubular section 30 of the pin 20.

The second pressure chamber 60, and the seal 64 could be omitted, and all the setting of the joint could be carried out by pressurising the first pressure chamber 52.

The edge profiles 32a, 32b can take many different forms they should however interact to prevent the tubular section 30 from being distorted radially inwards when the joint is set. The engagement shown in the drawing achieves this. It is important that the internal bore of the joined riser pipes 12, 14 is smooth and of a constant diameter, as various well components will have to pass up and down the tube.

One effect of the setting of the joint is to produce a radial force pressing the parallel mating surfaces of the profiles 32a and 32b into contact with one another. As a result, a metal to metal seal can be formed at this position. If the contact pressure between the two surfaces exceeds the pressure containing requirement of the joint, then this seal can provide the main seal at the interface between the pin and the box.

In one embodiment (not shown) a separate component may be fitted between the meeting edges of the pin and the box, this component forming a seal when the joint is set.

Figure 2:
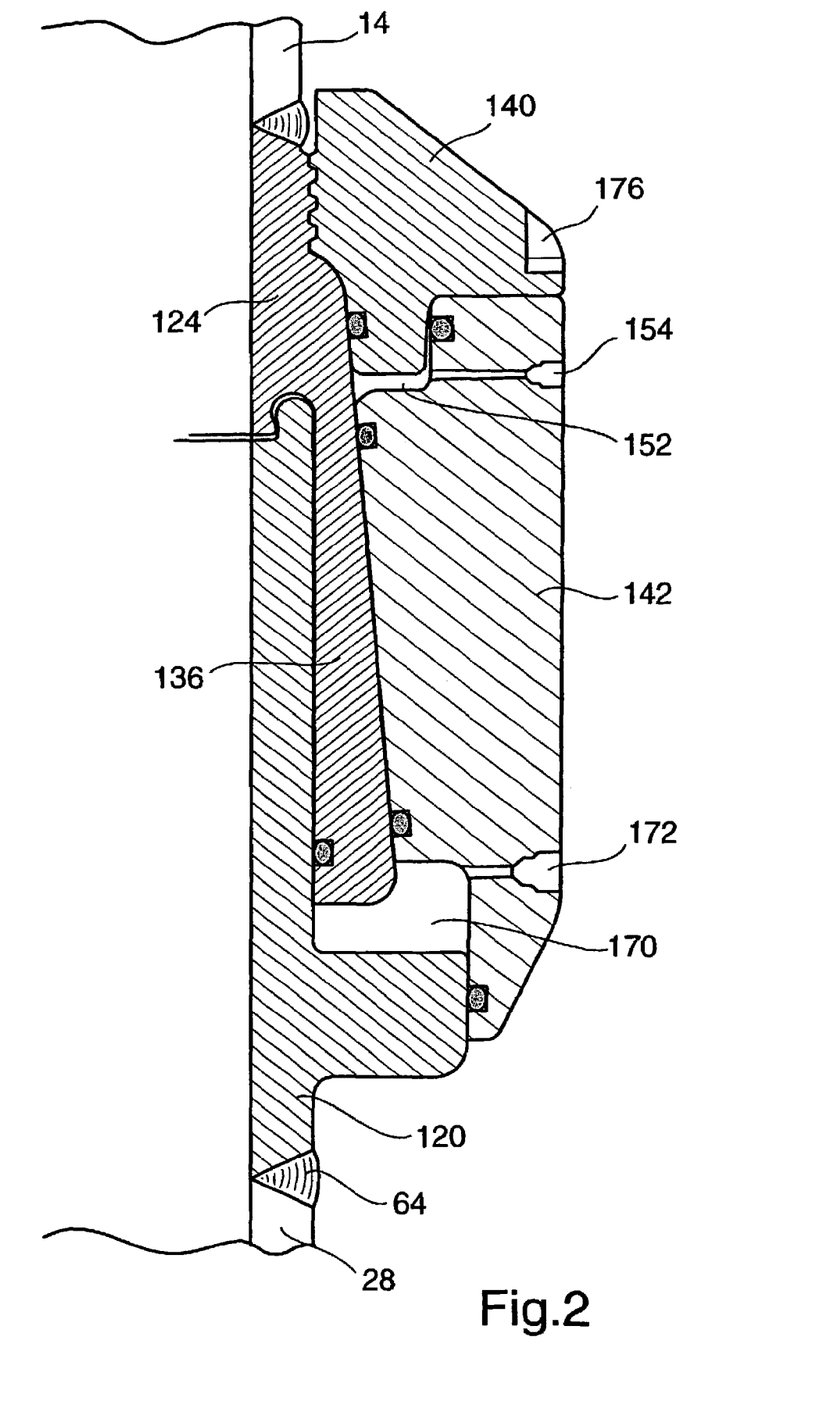
FIG. 2 shows a section through an example of a completed pipe joint in accordance with a second embodiment of the invention.

In the embodiment of FIG. 2, components which correspond to those in FIG. 1 are denoted by the same reference numeral, incremented by 100.

In this embodiment, there is a single lock pressure chamber 152 with a port 154 and a single release pressure chamber 170 with a port 172. The taper surfaces on the skirt 136 and on the sleeve 142 are the opposite way round, so that the sleeve is forced downwards to lock and upwards to release. After locking, the pressure is released from the chamber 152 and the locknut 140 is screwed down using the torquing slots 176 to maintain the lock. The locknut is thus in compression when in the locked position.

The joint will normally made up at the surface in the process of running the riser. It can alternatively be set remotely by the application of hydraulic pressure passed down a well along a hydraulic line. The locknut can be tightened by a suitable downhole running tool. Normally made up at surface in the process of running.

Figure 3:
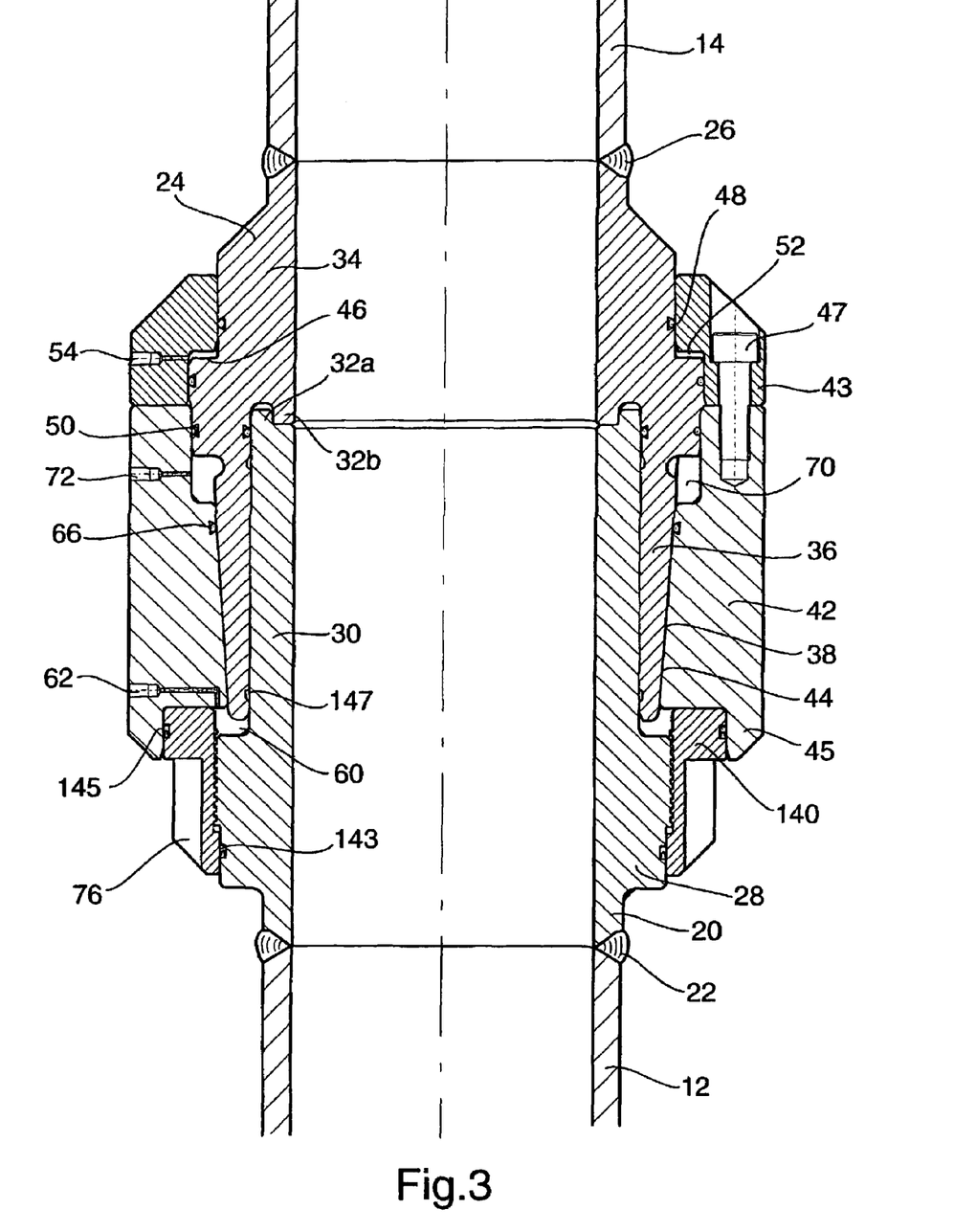
FIG. 3 shows a section through an example of a completed pipe joint in accordance with a third embodiment of the invention.

FIG. 3 differs from the embodiment shown in FIG. 1 by placing the locknut beneath the axially movable sleeve and by making the sleeve in two parts. Other than that, most of the features of the embodiment shown in FIG. 3 correspond to features described with reference to FIG. 1, and the same reference numerals have been used.

Mounted on the box 24 is a sleeve 42. The sleeve 42 is in two parts, namely an upper part 43 and a lower part 45. These parts are assembled together by bolts 47 equally spaced around the circumference (only one can be seen in FIG. 3). The sleeve also has an internal tapered face 44 which cooperates with the tapered outer face 38 of the box 24.

A locknut 140 is mounted on the pin 20, on a thread 141, below the sleeve 42. The locknut is sealed against the main pin section 20 by a seal 143 and against the sleeve 42 by a seal 145.

The first lock pressure chamber 52 is formed above the shoulder 46, between seals 48 and 50 and has a pressure port 54.

The second lock pressure chamber 60 with a pressure port 62 is located between the landing shoulder 28, the sleeve 42 and the locknut 140, this chamber being sealed by seals at 143, 145 and 147. A release pressure chamber 70 is located between the box main section 34 and the sleeve 42. This chamber has pressure port 72 and is sealed by seals 50 and 66.

In use, with the pin 20 welded to the pipe 12 and the box 24 welded to the pipe 14 and the sleeve 42 assembled around the shoulder 46, the box is slid over the pin until the edge profiles 32a, 32b meet one another.

Next, pressure is applied to the first pressure chamber 52. This has the effect of drawing the sleeve 42 upwards relative to the skirt 36, and as this upward movement continues, the taper action between the sleeve 42 and skirt 36 will compress the skirt inwardly, to grip the tubular section 30 of the pin 20. In this condition, the pin 20 and box 24 are locked together.

To permanently lock the joint, so that there is no reliance on the maintenance of pressure in either of the chambers 52 and 60, the pressure in the chamber 52 is released and the locknut 140 is screwed up (the nut has torquing slots 76 around its outer edge) until the nut is in contact with the bottom of the sleeve 42. Further rotation of the nut will hold the sleeve 42 in an uppermost position where it applies compressive hoop stresses to the skirt 36.

To release the joint, the locknut 140 is slackened off and pressure applied in the release chamber 70. This forces the sleeve downwards to release the hoop stresses on the skirt 36 which in turn release its frictional grip on the tubular section 30 of the pin 20.

Figure 4:
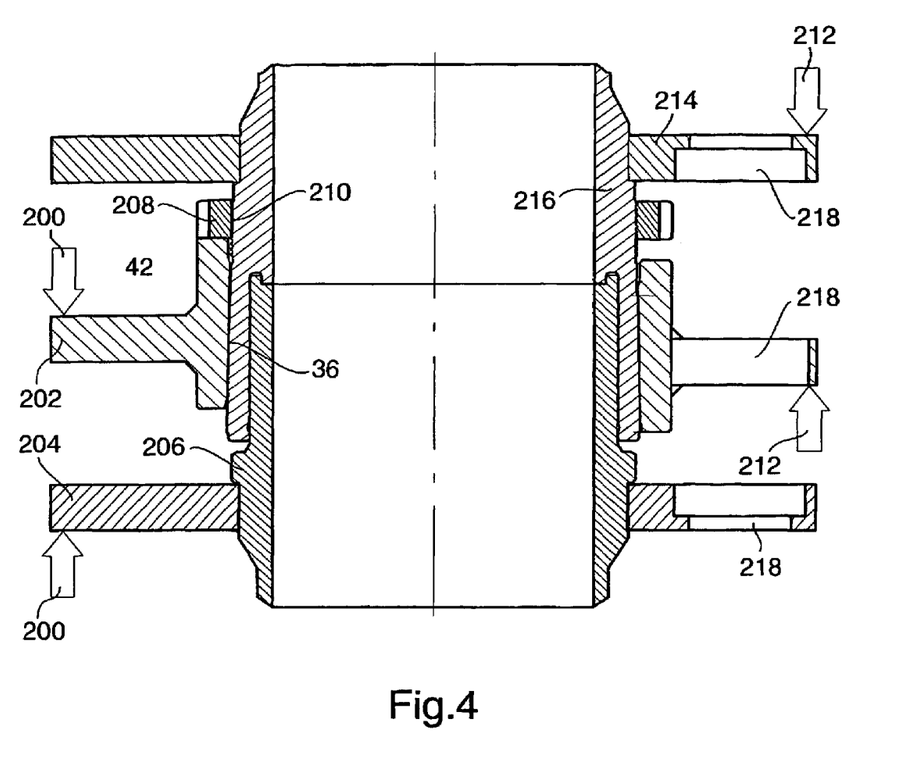
FIG. 4 shows an example of a completed pipe joint in accordance with a second embodiment of the invention.

FIG. 4 shows an alternative embodiment where the joint is set by purely mechanical means. In FIG. 4, the left hand side of the drawing shows the joint being set and the left hand side shows the joint being released.

To set the joint, force is applied as indicated by arrows 200, between an annular flange 202 fixed to the sleeve 42 and a further flange 204 located beneath a shoulder 206 on the pin 20. In this figure, the taper between the skirt 36 and the sleeve 42 is very slight, but a taper is present so that downward movement of the sleeve applies the necessary radial compressive force to the skirt 36, as described above.

Once the joint has been set, a locknut 208 is screwed down, on a thread 210, to hold the sleeve 42 in its lowered position. The locknut 208 can have gear teeth cut on its outer circumference, so that it can be run down on its thread by a corresponding gearwheel in the automated running device, or on a running tool.

The right hand side of FIG. 4 shows the direction of application of a releasing force, by arrows 212. This force is exerted between the flange 202 and a further flange 214, supported against a shoulder 216. Before the force 212 is applied, the locknut 208 is undone so that it sits at a position such as that shown on the right hand side of the Figure.

The flanges 202, 204 and 212 all have through apertures 218 through which kill and choke lines can be passed. The kill and choke lines can be stabbed together in the same operation as the insertion of the pin 20 in the box 24. Furthermore, the seal mechanism for the kill and choke lines can be activated or enhanced by the action of bringing the flanges 202 and 204 together.

Figure 5:
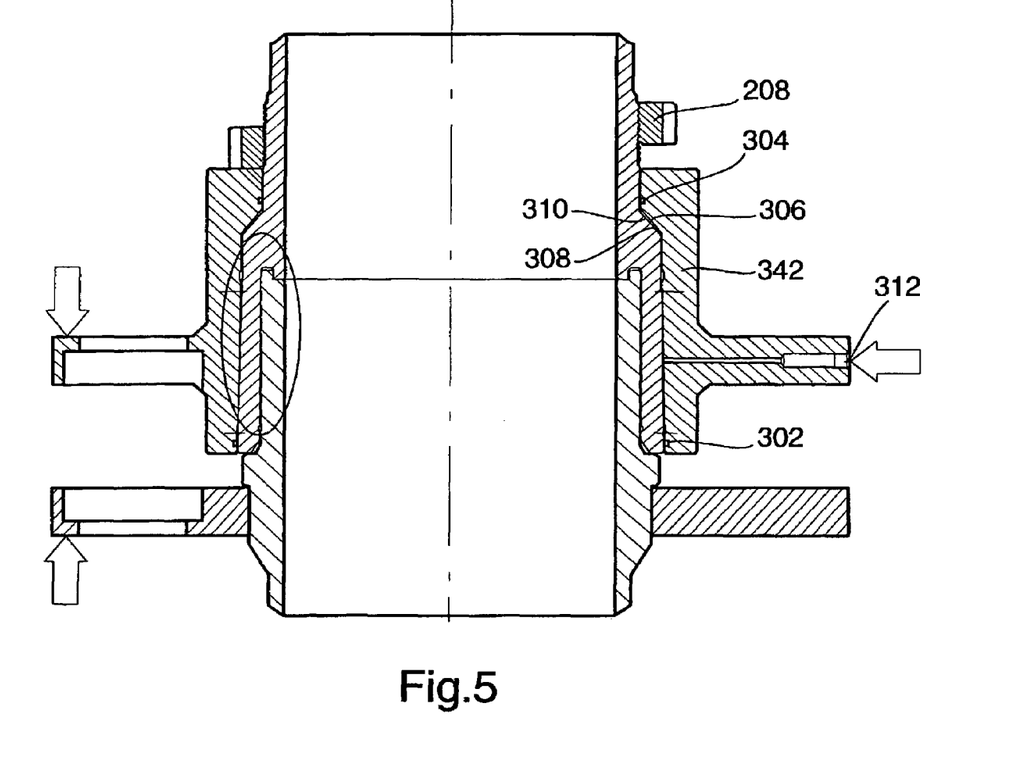
FIG. 5 shows an example of a completed pipe joint in accordance with a second embodiment of the invention.

FIG. 5 shows an embodiment where the make up (left hand side of the Figure) is mechanical, in the same way as in FIG. 4, but the release function (right hand side of the Figure) is carried out hydraulically. To enable this to happen, hydraulic seals are fitted at 302 and 304, and the sleeve 342 is constructed with an inward facing shoulder 306 which overlaps a corresponding shoulder 308 on the box 24, to form a pressure chamber 310. Pressure applied in this chamber, through a port 312, will exert a lifting force on the sleeve 342.

Figure 6:
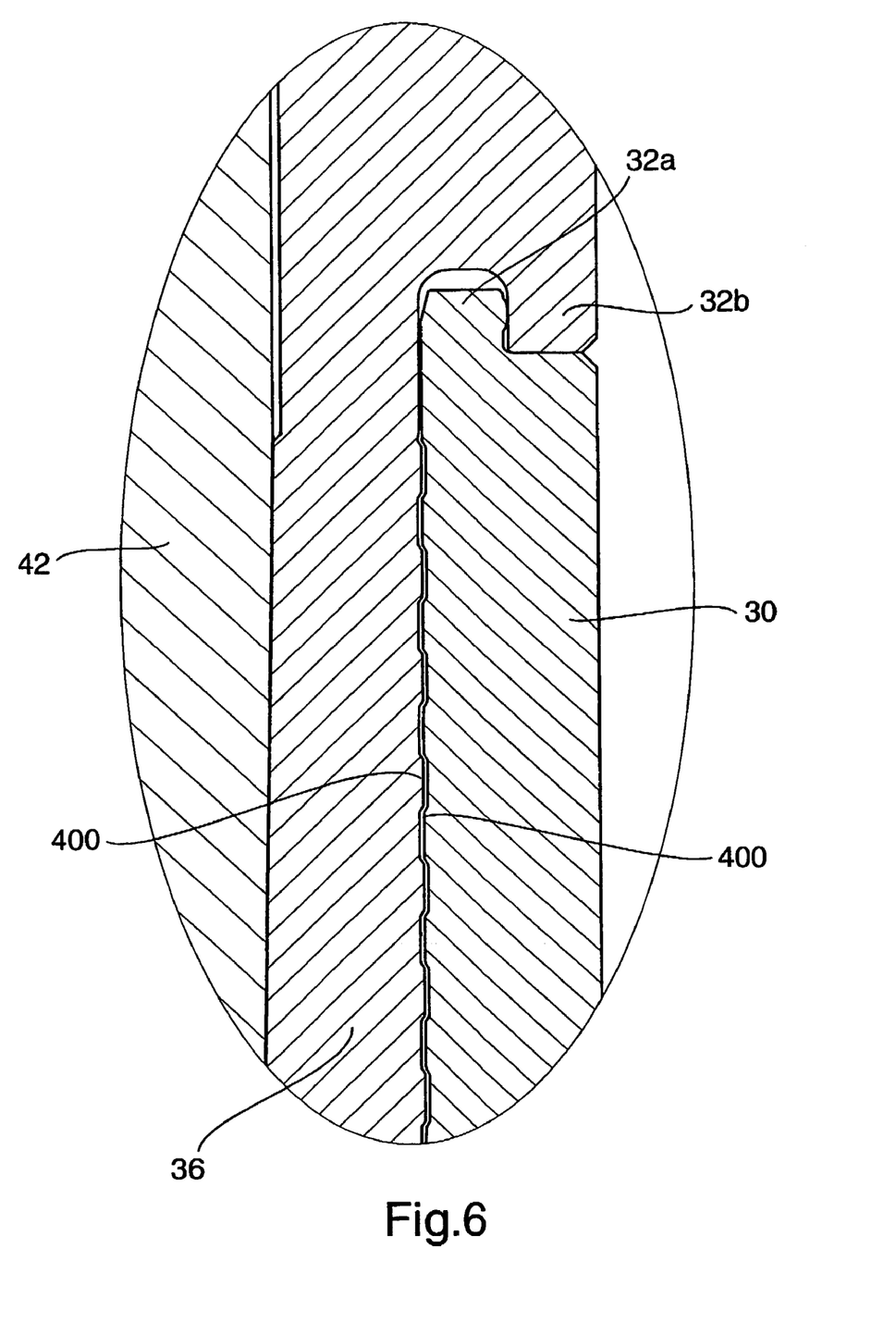
FIG. 6 shows a detail through a part of the joint of FIG. 5.

FIG. 6 shows the edge profiles 32a, 32b which can take many different forms. They may interact to prevent the leading tip of the tubular section 30 from being distorted radially inwards when the joint is set. The engagement shown in FIG. 6 achieves this. FIG. 6 also shows a seal tip 33 formed on the inward facing surface of the profile 32a which, when the joint is made up, will generate a metal to metal seal with the facing surface of the profile 32b.

One effect of the setting of the joint is to produce a radial force pressing the parallel mating surfaces of the profiles 32a and 32b into contact with one another. As a result, a metal to metal seal can be formed at this position in addition to the metal to metal seal between the skirt 36 and the tubular section 30. If the contact pressure between the two surfaces exceeds the pressure containing requirement of the joint, then this seal can provide the main seal at the interface between the pin and the box.

It will be seen from FIG. 6 that the mating faces of the components 30 and 36 are formed with annular ribs 400 with a generally trapezoid cross-section, the ribs are positioned so that they interlock when the components are in the correct relative angular positions. The height of the ribs should not interfere with the assembly of the joint, save that there may be a slight 'click-click-click' engagement as the pin is inserted in the box, but this should not cause any substantial increase in the force needed to assemble the joint.

When the joint is set, the ribs on one component will engage between the ribs on the other component. This will result in an increase in the resistance to axial separation of the pipes in the joint.

Furthermore, when the clamping force is applied to the joint, any slight axial misalignment will be corrected as the angled flanks of the ribs ride on one another to correctly position the two components.

Still further, the presence of the ribs will result in reliable annular metal to metal seals being formed at the location of each rib.

In one embodiment (not shown) a separate component may be fitted between the meeting edges of the pin and the box, this component forming a seal when the joint is set.

Figure 7:
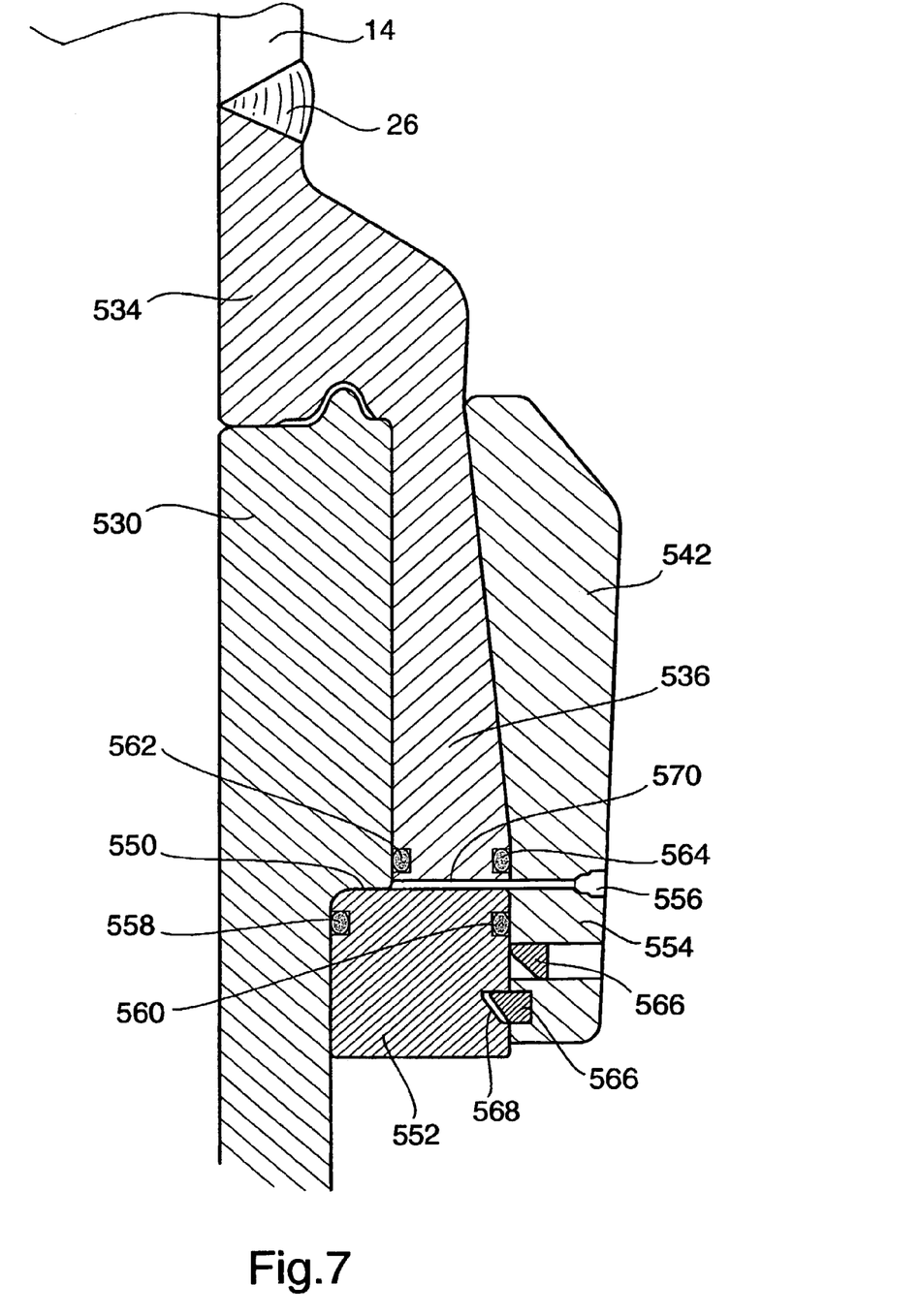
FIG. 7 shows an alternative lock mechanism.

FIG. 7 shows an embodiment in which details of the joint make-up only are shown. The tubular section 530 has a downward facing shoulder 550, and carries a ring 552 below this shoulder.

The main box section 534 carries the sleeve 542 which has a lower section 554 for engagement with the ring 552. The sleeve 542 also has a pressure port 556. Seals 558 and 560 are provided on the ring and seals 562 and 564 are provided on the skirt 536.

In use, the pin 530 will be inserted into the box 534. In doing so, the lower end of the sleeve 542 will fit around the ring 552, and spring-loaded dogs 566 will snap into corresponding recesses 568 around a circumference of the ring 552. There may be more than one of these dogs at different axial positions, and/or more than one recess. It will be obvious that the positions of the dogs and recesses could be reversed.

Once the dogs and recesses have engaged, pressure is applied through the port 556 into a chamber 570. This will result in the ring 552 being pushed downwards on the pin 530, pulling the sleeve 542 with it so that the skirt 536 is pressed inwardly to clamp the joint.

It is important that the internal bore of the joined riser pipes 12, 14 is smooth and of a constant diameter, as various well components will have to pass up and down the tube.

A wellhead can be mounted on a well using a joint of this type, with a stub pipe or the like extending from the underside of the wellhead forming one of the two pipes of the invention.

This invention is equally applicable to the joining of two pipes or riser joints, and of connecting a pipe or riser joint to a wellhead or other subsea connection. Additionally the joint may be used in applications where there is no requirement to form a seal between the components, as in a structural application or tether joint.

The invention claimed is:

1. A pipe joint for joining a first and a second pipe having substantially the same internal diameters, said pipe joint comprising:

a first pipe end having an integral annular socket for receiving a second pipe end wherein an outer wall of said socket has an annular, axially tapering surface extending over at least a portion of an outer wall of said second pipe end and an inner wall of said socket has an internal diameter sized and shaped to fit over at least a portion of said second pipe;

an axially movable sleeve surrounding said axially tapering outer wall of said socket and having a corresponding tapering inner surface facing said axially tapering outer wall of said socket;

a pressure chamber between the non-tapered portions of the sleeve and the socket, said pressure chamber disposed for receipt of pressurized fluid to produce relative movement between said tapering surfaces of said socket and said sleeve along a longitudinal axis and along a radial axis of said first and second pipes to exert a radial compressive force to said outer wall of said socket into frictional contact with said outer wall of said second pipe;

a lock to secure the relative positions of the sleeve and the socket; and a release chamber to which hydraulic pressure can be admitted to separate the socket and the sleeve.

2. A pipe joint as claimed in claim 1, wherein said lock includes a locknut to lock the relative positions of the sleeve and the socket, once these components have been brought into an active position.

3. A pipe joint as claimed in claim 1, wherein the inner wall of the socket and an outer wall of the tubular section have interengaging profiles.

4. A pipe joint as claimed in claim 3, wherein the interengaging profiles from a metal to metal seal when the joint is set.

5. A pipe joint as claimed in claim 3, wherein the interengaging profiles are annular ribs, and a rib on one surface meshes with a space between two ribs on the other surface, when the tubular section is inserted in the socket.

6. A pipe joint as claimed in claim 1, wherein the tapering surfaces have a taper angle of between 2° and 6°.

* * * * *